United States Patent
Kang et al.

(10) Patent No.: US 9,624,361 B2
(45) Date of Patent: Apr. 18, 2017

(54) RUBBER COMPOSITION FOR TIRE TREAD AND TIRE MANUFACTURED BY USING THE SAME

(71) Applicant: HANKOOK TIRE CO., LTD., Seoul (KR)

(72) Inventors: Cheol Han Kang, Sejong-si (KR); Il Yong Park, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 115 days.

(21) Appl. No.: 14/222,577

(22) Filed: Mar. 21, 2014

(65) Prior Publication Data

US 2015/0057391 A1 Feb. 26, 2015

(30) Foreign Application Priority Data

Aug. 20, 2013 (KR) ......................... 10-2013-0098451

(51) Int. Cl.
*C08L 9/00* (2006.01)
*C08L 9/06* (2006.01)
*B60C 1/00* (2006.01)

(52) U.S. Cl.
CPC .............. *C08L 9/06* (2013.01); *B60C 1/0016* (2013.04)

(58) Field of Classification Search
CPC ....................................................... C08L 9/00
See application file for complete search history.

(56) References Cited

U.S. PATENT DOCUMENTS

| | | | |
|---|---|---|---|
| 5,569,697 A | 10/1996 | Ferrandino et al. | |
| 2005/0277717 A1* | 12/2005 | Joshi et al. | 524/261 |
| 2013/0065984 A1* | 3/2013 | Zhao | C08K 7/02 523/351 |

FOREIGN PATENT DOCUMENTS

| | | |
|---|---|---|
| EP | 0801112 A2 | 10/1997 |
| JP | 2005002225 A | 1/2005 |
| KR | 20130012089 A | 2/2013 |
| WO | 9829473 A1 | 7/1998 |
| WO | 03091327 | 11/2003 |

OTHER PUBLICATIONS

Solvay, Zeosil Product Information Sheet, http://www.solvay.com/en/binaries/TIRE%20SOLUTIONS%20FICHES-177295.pdf, Apr. 30, 2015.*

* cited by examiner

*Primary Examiner* — Liam J Heincer
*Assistant Examiner* — Chelsea M Christensen
(74) *Attorney, Agent, or Firm* — Renaissance IP Law Group LLP

(57) ABSTRACT

Provided are a rubber composition for tire tread containing 100 parts by weight of raw material rubber, 10 parts to 100 parts by weight of a reinforcing filler, and 1 part to 20 parts by weight of a silane compound represented by the following formula (1), the raw material rubber containing 40 parts to 90 parts by weight of a styrene-butadiene rubber and 10 parts to 60 parts by weight of a butadiene rubber; and a tire produced using the rubber composition. The rubber composition for tire tread exhibit improved dispersibility, processability, mechanical characteristics, abrasion resistance performance, and rolling resistance characteristics.

[Chemical Formula 1]

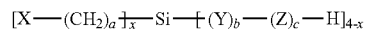

wherein X represents a vinyl group; Y represents an alkoxy group; Z represents an alkoxy group; a represents an integer from 0 to 6; b and c each independently represent an integer from 0 to 2 and do not necessarily represent 0 at the same time; and x represents an integer from 1 to 3.

7 Claims, No Drawings

RUBBER COMPOSITION FOR TIRE TREAD AND TIRE MANUFACTURED BY USING THE SAME

BACKGROUND OF THE INVENTION

1. Field of the Invention

The present invention relates to a rubber composition for tire tread having improved dispersibility, processability, mechanical characteristics, rolling resistance characteristics and abrasion resistance, and a tire produced using the rubber composition.

2. Description of the Related Art

Along with the recent demand for a decrease in the automobile fuel consumption, the development of low fuel consumption tires through a decrease in the tire rolling resistance is a major subject of interest, and in order to realize this, technologies for using silica in the tire tread rubber have been continuously developed.

Unlike the non-polar carbon black that has been widely used as a filler for tire tread rubber, silica has a large number of silanol groups (—SiOH) at the surface, and therefore, silica exhibits hydrophilicity. Also, due to the characteristic of strong polarity, silica does not have good miscibility with non-polar rubber. Thus, this problem has been solved by silane coupling agents.

In general, a silane coupling agent plays the role of reacting with a silanol group of silica and changes the polar nature, which is a surface chemical characteristic of silica, to a non-polar nature, thereby facilitating the mixing of silica with rubber. However, since the silane coupling agents that have been conventionally used contain sulfide groups, there is a problem that scorching frequently occurs at a temperature of 150° C. or higher, and processability is deteriorated (Korean Patent Application Publication No. 2011-0071607 (filed Jun. 29, 2011) and Korean Patent Application Publication No. 2011-0073061 (filed Jun. 29, 2011)).

The present invention was made in order to solve the problems described above, an object of the present invention is to provide a rubber composition for tire tread having improved dispersibility, processability, mechanical characteristics, rolling resistance characteristics and abrasion resistance.

Another object of the present invention is to provide a tire tread having improved low fuel consumption performance, which is produced using the rubber composition for tire tread described above.

SUMMARY OF THE INVENTION

According to an aspect of the present invention, there is provided a rubber composition for tire tread containing 100 parts by weight of raw material rubber, 10 parts to 100 parts by weight of a reinforcing filler, and 1 part to 20 parts by weight of a silane compound represented by the following formula (1), wherein the raw material rubber contains 40 parts to 90 parts by weight of a styrene-butadiene rubber, and 10 parts to 60 parts by weight of a butadiene rubber:

[Chemical Formula 1]

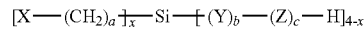

wherein in formula (1),

X represents a vinyl group ($CH_2=CH-$);

Y represents a functional group represented by the following formula (2a);

Z represents a functional group represented by the following formula (2b);

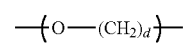

[Chemical Formula 2a]

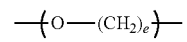

[Chemical Formula 2b]

(wherein d and e each independently represent an integer from 0 to 6);

a represents an integer from 0 to 6;

b and c each independently represent an integer from 0 to 2 but do not necessarily represent 0 at the same time, and x represents an integer from 1 to 3.

The silane compound may have a weight average molecular weight of 180 g/mol to 20,000 g/mol.

The silane compound may be selected from the group consisting of vinyltris(2-methoxyethoxy)silane, triethoxyvinylsilane, and mixtures thereof.

The reinforcing filler may be selected from a carbon black having a nitrogen adsorption specific surface area of 30 $m^2/g$ to 300 $m^2/g$, and an n-dibutyl phthalate (DBP) oil absorption of 60 cc/100 g to 180 cc/100 g; a silica having a nitrogen adsorption specific surface area of 100 $m^2/g$ to 180 $m^2/g$, and a cetyltrimethylammonium bromide (CTAB) adsorption specific surface area of 110 $m^2/g$ to 170 $m^2/g$; and mixtures thereof.

The rubber composition for tire tread may be a rubber composition further containing additives selected from the group consisting of 0.5 parts to 5 parts by weight of a vulcanizing agent, 0.1 parts to 10 parts by weight of a vulcanization accelerator, 1 part to 10 parts by weight of a vulcanization acceleration aid, 1 part to 50 parts by weight of a softening agent, 0.1 parts to 10 parts by weight of an aging preventing agent, 0.5 parts to 10 parts by weight of an adhesive, and mixtures thereof, all relative to 100 parts by weight of the raw material rubber.

According to another aspect of the present invention, there is provided a tire produced using the rubber composition for tire tread described above.

DETAILED DESCRIPTION OF THE PREFERRED EMBODIMENTS

Hereinafter, the present invention will be described in more detail.

Since the conventional silane coupling agents that are used at the time of preparing a rubber composition for tire tread contain sulfide groups in the molecule, scorching occurred at the time of high temperature mixing, and as a result, an increase in the mixing temperature is suppressed, so that it has been difficult to uniformly disperse a reinforcing filler in the tire rubber composition.

In this regard, since a silane-based compound having a structure in which a silicone is substituted with vinyl groups, is used in the present invention instead of the conventional silane-based compounds containing sulfide groups, uniform dispersion in the raw material rubber is enabled, and as a result, processability of the rubber composition can be enhanced. Also, since the occurrence of scorching caused by the use of the conventional silane coupling agents containing sulfide groups can be prevented, and thus high temperature mixing is enabled, the dispersity of the reinforcing filler can be increased, and the mechanical characteristics, abrasion resistance performance and rolling resistance characteristics of the rubber composition can be enhanced.

That is, the rubber composition for tire tread according to an aspect of the present invention contains 100 parts by weight of raw material rubber, 10 parts to 100 parts by weight of a reinforcing filler, and 1 part to 20 parts by weight of a silane compound represented by the following formula (1), wherein the raw material rubber contains 40 parts to 90 parts by weight of a styrene-butadiene rubber (SBR), and 10 parts to 60 parts by weight of a butadiene rubber (BR):

[Chemical Formula 1]

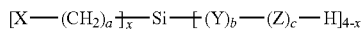

wherein in formula (1),

X represents a vinyl group ($CH_2=CH-$);

Y represents a functional group represented by the following formula (2a);

Z represents a functional group represented by the following formula (2b);

[Chemical Formula 2a]

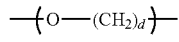

[Chemical Formula 2b]

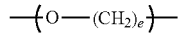

(wherein d and e each independently represent an integer from 0 to 6);

a represents an integer from 0 to 6;

b and c each independently represent an integer from 0 to 2 but do not necessarily represent zero at the same time; and x represents an integer from 1 to 3.

Furthermore, it is preferable that the silane compound have a weight average molecular weight (Mw) of 180 g/mol to 20,000 g/mol, in view of improving the effect of abrasion resistance performance.

The silane compound is preferably vinyltris(2-methoxyethoxy)silane, triethoxyvinylsilane, or a mixture thereof.

The silane compound such as described above is preferably included in the rubber composition in an amount of 1 part to 20 parts by weight relative to 100 parts by weight of the raw material rubber. If the content of the silane compound is less than 1 part by weight, the effect induced by the addition of a silane compound is negligible, and if the content is greater than 20 parts by weight, there is a risk that the mechanical properties of the blended rubber may be deteriorated. More preferably, the silane compound may be included in the rubber composition in an amount of 5 parts to 10 parts by weight relative to 100 parts by weight of the raw material rubber.

In the rubber composition for tire tread of the present invention, the raw material rubber may include 40 parts to 90 parts by weight of a styrene-butadiene rubber having high mechanical rigidity, and 10 parts to 60 parts by weight of a butadiene rubber having excellent abrasion resistance. As the rubber components are included at such optimal mixing ratios as described above, the abrasion performance, braking performance and fuel consumption performance can be enhanced at the time of rubber preparation. If the content of the butadiene rubber is less than 10 parts by weight, abrasion resistance can be decreased, and if the content is greater than 60 parts by weight, the Mooney viscosity increases as a result of a decrease in mixing processability, and there is a risk that the mechanical properties such as elongation and tensile strength, and abrasion resistance performance may be deteriorated. Preferably, the raw material rubber may include 60 parts to 80 parts by weight of a styrene-butadiene rubber, and 20 parts to 40 parts by weight of a butadiene rubber.

Furthermore, the styrene-butadiene rubber that can be used in the raw material rubber may be specifically a rubber having a styrene content of 22% to 25% by weight, a vinyl content of 15% to 18% by weight, a number average molecular weight (Mn) of 55,000 to 59,000, a weight average molecular weight (Mw) of 260,000 to 320,000, and a molecular weight distribution (MWD) of 3.8 to 4.2. When a styrene-butadiene rubber having such property characteristics as described above is used, the dispersibility, processability, rolling resistance characteristics, and abrasion resistance of the reinforcing filler in the rubber composition can be enhanced.

Furthermore, the butadiene rubber may be a high cis-butadiene rubber having a cis-1,4-butadiene content of 96% by weight or more, and a glass transition temperature (Tg) of $-104°$ C. to $-107°$ C. Furthermore, the butadiene rubber may have a Mooney viscosity of 43 to 47 at $100°$ C. When a high cis-butadiene rubber such as described above is used, it is advantageous in view of the abrasion resistance performance, and the heat build-up under dynamic stress.

In the rubber composition for tire tread of the present invention, the reinforcing filler may be selected from the group consisting of carbon black, silica and a mixture thereof.

When silica is used as the reinforcing filler, if the nitrogen adsorption specific surface area (nitrogen surface area per gram, $N_2SA$) of the silica is too low, specifically less than 100 $m^2/g$, there is a risk that the reinforcing performance of the silica as a filler may be deteriorated. On the other hand, if the nitrogen adsorption surface area of the silica is too high, specifically greater than 180 $m^2/g$, there is a risk that processability of the rubber composition may be decreased. Furthermore, if the cetyltrimethylammonium bromide (CTAB) adsorption specific surface area of the silica is too low, specifically less than 110 $m^2/g$, there is a risk that the reinforcing performance of the silica as a filler may be deteriorated. On the other hand, if the CTAB adsorption specific surface area of silica is too high, specifically greater than 170 $m^2/g$, there is a risk that processability of the rubber composition may be decreased. Accordingly, when the influence exerted on the reinforcing performance and processability of the rubber composition is considered, it is more preferable to use a silica having a nitrogen adsorption specific surface area of 100 $m^2/g$ to 180 $m^2/g$ and a CTAB adsorption specific surface area of 110 $m^2/g$ to 170 $m^2/g$.

Regarding the silica, silica produced by a wet method and silica produced by a dry method can all be used, and examples of commercially available products that can be used include ULTRASIL VN2 (manufactured by Evonik Industries AG), ULTRASIL VN3 (manufactured by Evonik Industries AG), ULTRASIL 7000Gr (manufactured by Evonik Industries AG), Z1165MP (manufactured by Rhodia S.A.) and Z165GR (manufactured by Rhodia S.A.).

Furthermore, when carbon black is used as the reinforcing filler, if the nitrogen adsorption specific surface area (nitrogen surface area per gram, $N_2SA$) of the carbon black is too low, specifically less than 30 $m^2/g$, there is a risk that the reinforcing performance of the carbon black as a filler may be deteriorated. On the other hand, if the nitrogen adsorption specific surface area of the carbon black is too high, specifically greater than 300 m²/g, there is a risk that processability of the rubber composition for tire may be decreased. Furthermore, if the DBP (n-dibutyl phthalate) oil absorption of the carbon black is too low, specifically less than 60 cc/100 g, there is a risk that the reinforcing performance of the carbon black as a filler may be rather deteriorated. If the DBP oil absorption oil absorption is too high, specifically greater than 180 cc/100 g, processability of the rubber composition may be decreased. Accordingly, when the influence exerted on the reinforcing performance and processability of the rubber composition is considered, it is more preferable to use a carbon black having a nitrogen adsorption specific surface area of 30 m²/g to 300 m²/g and a DBP oil adsorption of 60 cc/100 g to 180 cc/100 g.

Specifically, examples of the carbon black that can be used include N110, N121, N134, N220, N231, N234, N242, N293, N299, 5315, N326, N330, N332, N339, N343, N347, N351, N358, N375, N539, N550, N582, N630, N642, N650, N683, N754, N762, N765, N774, N787, N907, N908, N990 and N991.

When the mechanical characteristics improving effect and processability of the rubber composition for tire tread are considered, it is preferable that the reinforcing filler such as described above be included in an amount of 10 parts to 100 parts by weight relative to 100 parts by weight of the raw material rubber. If the content of the reinforcing filler is less than 10 parts by weight, the mechanical characteristics improving effect is negligible, and if the content of the reinforcing filler is more than 100 parts by weight, there is a risk that processability of the rubber composition may be decreased.

The rubber composition for tire tread according to the present invention may further include, in addition to the components described above, additives that are conventionally used for an improvement of property characteristics of a rubber composition for tire tread, such as a vulcanizer, a vulcanization accelerator, a vulcanization acceleration aid, a softening agent, an aging preventing agent and an adhesive. The rubber composition for tire tread of the present invention can include the additives singly or as mixtures of two or more kinds.

Specifically, examples of the vulcanizing agent that can be used include sulfur-based vulcanizing agents, organic peroxides, resin vulcanizing agents, and metal oxides such as magnesium oxide.

Examples of the sulfur-based vulcanizing agents that can be used include inorganic vulcanizing agents such as sulfur powder (S), insoluble sulfur (S), precipitated sulfur (S), and colloidal sulfur; and organic vulcanizing agents such as tetramethylthiuram disulfide (TMTD), tetraethylthiuram disulfide (TETD), and dithiodimorpholine. In addition to these, elemental sulfur or a vulcanizing agent that produces sulfur, for example, amine disulfide or polymeric sulfur, can also be used.

Furthermore, examples of the organic peroxides that can be used include benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexane, 1,3-bis (t-butylperoxypropyl)benzene, di-t-butylperoxydiisopropylbenzene, t-butylperoxybenzene, 2,4-dichlorobenzoyl peroxide, 1,1-dibutylperoxy-3,3,5-trimethylsiloxane, and n-butyl-4,4-di(t-butylperoxy) valerate.

The vulcanizing agent is preferably included in an amount of 0.5 parts to 5 parts by weight relative to 100 parts by weight of the raw material rubber, from the viewpoint that an appropriate vulcanizing effect makes the raw material rubber less sensitive to heat and chemically stable.

The vulcanization accelerator means an accelerator that accelerates the rate of vulcanization or accelerates the retarding action in the initial vulcanization stage. Regarding the vulcanization accelerator, any one selected from the group consisting of sulfenamide-based compounds, thiazole-based compounds, thiuram-based compounds, thiourea-based compounds, guanidine-based compounds, dithiocarbamic acid-based compounds, aldehyde-amine-based compounds, aldehyde-ammonia-based compounds, imidazoline-based compounds, xanthate-based compounds and combinations thereof can be used.

Regarding the sulfenamide-based vulcanization accelerators, for example, any one sulfenamide-based compound selected from the group consisting of N-cyclohexyl-2-benzothiazyl sulfenamide (CBS), N-tert-butyl-2-benzothiazyl sulfenamide (TBBS), N,N-dicyclohexyl-2-benzothiazyl sulfenamide, N-oxydiethylene-2-benzothiazyl sulfenamide, N,N-diisopropyl-2-benzothiazole sulfenamide, and combinations thereof can be used.

Regarding the thiazole-based vulcanization accelerator, for example, any one thiazole-based compound selected from the group consisting of 2-mercaptobenzothiazole (MBT), dibenzothiazyl disulfide (MBTS), sodium salt of 2-mercaptobenzothiazole, zinc salt of 2-mercaptobenzothiazole, copper salt of 2-mercaptobenzothiazole, cyclohexylamine salt of 2-mercaptobenzothiazole, 2-(2,4-dinitrophenyl)mercaptobenzothiazole, 2-(2,6-diethyl-4-moerpholinothio)benzothiazole, and combinations thereof can be used.

Regarding the thiuram-based vulcanization accelerator, for example, any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethyelnethiuram hexasulfide, tetrabutylthiuram disulfide, pentamethylenethiuram tetrasulfide, and combinations thereof can be used.

Regarding the thiourea-based vulcanization accelerator, for example, any one thiourea-based compound selected from the group consisting of thiacarbamide, diethylthiourea, dibutylthiourea, trimethylthiourea, di-ortho-tolylthiourea, and combinations thereof can be used.

Regarding the guanidine-based vulcanization accelerator, for example, any one guanidine-based compound selected from the group consisting of diphenylguanidine, di-ortho-tolylguanidine, triphenylguanidine, ortho-tolylbiguanide, diphenylguanidine phthalate, and combinations thereof can be used.

Regarding the dithiocarbamic acid-based vulcanization accelerator, for example, any one dithiocarbamic acid-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salt of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, and combinations thereof can be used.

Regarding the aldehyde-amine-based or aldehyde-ammonia-based vulcanization accelerator, for example, an aldehyde-amine-based or aldehyde-ammonia-based compound selected from the group consisting of acetaldehyde-aniline reaction product, butylaldehyde-aniline condensate, hexamethylenetetramine, acetaldehyde-ammonia reaction product, and combinations thereof can be used.

Regarding the imidazoline-based vulcanization accelerator, for example, an imidazoline-based compound such as 2-mercaptoimidazoline can be used, and regarding the xanthate-based vulcanization accelerator, for example, a xanthate-based compound such as zinc dibutyl xanthogenate can be used.

The vulcanization accelerator may be included in an amount of 0.1 parts to 10 parts by weight relative to 100 parts by weight of the raw material rubber, in order to maximize the increase of productivity through the acceleration of the rate of vulcanization, and to maximize the increase of rubber properties.

The vulcanization acceleration aid is an additive used in combination with the vulcanization accelerator in order to augment the accelerating effect, and any one selected from the group consisting of inorganic vulcanization acceleration aids, organic vulcanization acceleration aids, and combinations thereof can be used.

Regarding the inorganic vulcanization accelerator aid, any one selected from the group consisting of zinc oxide (ZnO), zinc carbonate, magnesium oxide (MgO), lead oxide, potassium hydroxide and combinations thereof can be used. Regarding the organic vulcanization acceleration aid, any one selected from the group consisting of stearic acid, zinc stearate, palmitoic acid, linoleic acid, oleic acid, lauric acid, dibutylammonium oleate, derivatives thereof, and combinations thereof can be used.

Particularly, zinc oxide and stearic acid can be used together as the vulcanization acceleration aid. In this case, zinc oxide is dissolved in stearic acid and forms an effective complex with the vulcanization accelerator, and the complex produces free sulfur in the vulcanization reaction, thereby facilitating the crosslinking reaction of rubber.

In the case of using zinc oxide and stearic acid together, it may be preferable to use each of the compounds in an amount of 1 part to 10 parts by weight relative to 100 parts by weight of the raw material rubber, for the role of adequate vulcanization acceleration aids.

The softening agent is added to a rubber composition in order to facilitate processing by imparting plasticity to rubber, or in order to decrease the hardness of vulcanized rubber, and means an oil or other materials that are used at the time of rubber blending or rubber production. Regarding the softening agent, any one selected from the group consisting of petroleum-based oil, plant oils and fats, and combinations thereof can be used, but the present invention is not intended to be limited thereto.

Regarding the petroleum-based oil, any one selected from the group consisting of paraffin-based oils, naphthene-based oils, aromatic oils, and combinations thereof can be used.

Representative examples of the paraffin-based oils include P-1, P-2, P-3, P-4, P-5, and P-6 manufactured by Michang Oil Industrial Co., Ltd. Representative examples of the naphthene-based oils include N-1, N-2 and N-3 manufactured by Michang Oil Industrial Co., Ltd., and representative examples of the aromatic oils include A-2 and A-3 manufactured by Michang Oil Industrial Co., Ltd.

However, along with the recently increased environmental awareness, it is known that when the content of polycyclic aromatic hydrocarbons (hereinafter, referred to as "PAHs") contained in the aromatic oils is 3% by weight or more, the possibility of cancer induction is high. Thus, treated distillate aromatic extract (TDAE) oils, mild extraction solvate (MES) oils, residual aromatic extract (RAE) oils, or heavy naphthenic oils can be preferably used.

Particularly, regarding the oil used as the softening agent, TDAE oils having a total content of PAH components of 3% by weight or less based on the entire amount of oil, a dynamic viscosity of 95° C. or higher (210° F. SUS), a content of aromatic components of 15% to 25% by weight, a content of naphthene-based components of 27% to 37% by weight, and a content of paraffin-based components of 38% to 58% by weight, can be preferably used.

The TDAE oils excellently improve the low temperature characteristics and fuel consumption performance of a tire tread containing the TDAE oils, and also have advantageous characteristics against environmental factors such as the possibility of cancer induction of PAHs.

Regarding the plant oils and fats, any one selected from the group consisting of castor oil, cotton seed oil, linseed oil, canola oil, soy bean oil, palm oil, coconut oil, peanut oil, pine oil, pine tar, tall oil, corn oil, rice bran oil, safflower oil, sesame oil, olive oil, sunflower oil, palm kernel oil, camellia oil, jojoba oil, macadamia nut oil, safflower oil, tung oil, and combinations thereof can be used.

The softening agent is preferably used in an amount of 1 part to 50 parts by weight relative to 100 parts by weight of the raw material rubber, from the viewpoint of improving processability of the raw material rubber.

The aging preventing agent is an additive used to stop the chain reactions by which the tire is spontaneously oxidized by oxygen. Regarding the aging preventing agent, any one selected from the group consisting of amines, phenols, quinolines, imidazoles, carbamic acid metal salts, waxes and combinations thereof can be appropriately selected and used.

Regarding the amine-based aging preventing agents, any one selected from the group consisting of N-phenyl-N'-(1, 3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine, and combinations thereof can be used.

Regarding the phenol-based aging preventing agent, any one selected from the group consisting of 2,2'-methylenebis (4-methyl-6-tert-butylphenol), 2,2'-isobutylidenebis(4,6-dimethylphenol), 2,6-di-t-butyl-p-cresol, and combinations thereof can be used.

Regarding the quinoline-based aging preventing agent, 2,2,4-trimethyl-1,2-dihydroquinoline and derivatives thereof can be used, and specifically, any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and combinations thereof can be used.

Regarding the wax, waxy hydrocarbons can be preferably used.

Regarding the aging preventing agent, in addition to the aging preventing action, when conditions such as having high solubility in rubber and low volatility, being inactive to rubber, and not inhibiting vulcanization are considered, the aging preventing agent may be included in an amount of 0.1 parts to 10 parts by weight relative to 100 parts by weight of the raw material rubber.

The adhesive contributes to an enhancement of the properties of rubber by further enhancing the adhesion performance between rubber and rubber, and improving miscibility, dispersity and processability of other additives such as a filler.

Regarding the adhesive, natural resin-based adhesives such as rosin-based resins and terpene-based resins; and synthetic resin-based adhesives such as petroleum resins, coal tar, and alkylphenol-based resins can be used.

Regarding the rosin-based resins, any one selected from the group consisting of a rosin resin, a rosin ester resin, a hydrogenated rosin ester resin, derivatives thereof, and combinations thereof can be used. Regarding the terpene-based resins, any one selected from the group consisting of a terpene resin, a terpene phenol resin, and combinations thereof can be used.

Regarding the petroleum resins, any one selected from the group consisting of aliphatic resins, acid-modified aliphatic resins, alicyclic resins, hydrogenated alicyclic resins, aromatic (C9) resins, hydrogenated aromatic resins, C5-C9 copolymer resins, styrene resins, styrene copolymer resins, and combinations thereof can be used.

The coal tar may be a coumarone-indene resin.

Regarding the alkylphenol resins, p-tert-alkylphenol formaldehyde resins may be used, and any one selected from the group consisting of p-tert-butylphenol formaldehyde resin, p-tert-octylphenol formaldehyde, and combinations thereof can be used.

The adhesive can be included in an amount of 0.5 parts to 10 parts by weight relative to 100 parts by weight of the raw material rubber. If the content of the adhesive is less than 0.5 parts by weight relative to 100 parts by weight of the raw material rubber, the adhesion performance is deteriorated, and if the content is more than 10 parts by weight, the rubber properties may deteriorate, which is not preferable.

The rubber composition for tire tread can be prepared by mixing the components described above according to a conventional method. Specifically, the rubber composition for tire tread can be prepared by a two-stage continuous process including a first step of subjecting the components to a thermomechanical treatment or kneading at a high temperature, such as a maximum temperature of 110° C. to 190° C., and preferably 130° C. to 180° C.; and a second step of subjecting the composition to a mechanical treatment at a low temperature of typically lower than 110° C., for example, 40° C. to 100° C., during the finishing stage in which the crosslinking bonding system is mixed. However, the present invention is not intended to be limited thereto.

Since the rubber composition for tire tread prepared by the method described above contains a silane-based compound having a structure in which a silicone is substituted with vinyl groups, the silane-based compound and a reinforcing filler in the rubber composition for tire tread can be uniformly dispersed, and as a result, processability, abrasion resistance and low rolling resistance characteristics of the rubber composition can be enhanced. Accordingly, the rubber composition for tire tread can be included not only in the tread (tread cap and tread base), but also in various rubber constituent elements that constitute the tire. Examples of the rubber constituent elements include side walls, side wall inserts, apexes, chafers, wire coats and inner liners.

According to another aspect of the present invention, there is provided a tire produced using the rubber composition for tire tread.

Since the tire is produced from the rubber composition for tire tread described above, the tire can exhibit improved abrasion resistance performance, low rolling characteristics, and increased lifetime characteristics.

Regarding the method for producing the tire, any method that is conventionally used in the manufacture of tires can be applied as long as the rubber composition for tire tread described above is used, and the detailed explanation will not be given in the present specification. However, the tire may include a tire tread produced by using the rubber composition for tire tread described above.

Examples of the tire include tires for passenger cars, tires for racing cars, tires for airplanes, tires for agricultural machines, tire for off-the-road driving, truck tires and bus tires. Furthermore, the tire may be a radial tire or a bias tire, and it is preferable that the tire be a radial tire.

The rubber composition for tire tread according to the present invention contains a silane-based compound having vinyl groups as a coupling agent. Therefore, uniform dispersion of a reinforcing filler in the raw material rubber is enabled, and as a result, processability of the rubber composition can be enhanced. Also, the occurrence of scorching caused by the use of silane coupling agents containing sulfide groups can be prevented, and high temperature mixing is enabled. Therefore, the dispersity of the reinforcing filler is further increase, and the mechanical characteristics, abrasion resistance performance and rolling resistance characteristics of the rubber composition can be enhanced.

Therefore, a tire produced from the rubber composition for tire tread according to the present invention has improved mechanical characteristics, abrasion resistance performance and rolling resistance characteristics, and a result, increased service life characteristics can be exhibited.

EXAMPLES

Hereinafter, the present invention will be described in detail by way of Examples so that those having ordinary skill in the art can easily carry out the invention. However, the present invention can be realized in various different forms, and is not intended to be limited to the Examples described herein.

Comparative Example 1

As disclosed in the following Table 1, 100 parts by weight of raw material rubber obtained by mixing 80 parts by weight of a styrene-butadiene rubber and 20 parts by weight of a butadiene rubber, was blended in a Banbury mixer with 60 parts by weight of silica, 5 parts by weight of a silane coupling agent (TESPT), 35 parts by weight of a softening agent, 3 parts by weight of zinc oxide, 1 part by weight of stearic acid, 2.5 parts by weight of an aging preventing agent, 1.8 parts by weight of a vulcanization accelerator, and 2 parts by weight of sulfur. Thus, a rubber composition for tire tread was prepared.

Comparative Examples 2 to 4 and Examples 1 to 3

Rubber compositions for tire tread were prepared by the same method as in Comparative Example 1, except that the components of the rubber compositions for tire tread were mixed at the composition ratios and contents described in the following Table 1, and the blends thus obtained were used.

TABLE 1

Unit: parts by weight

|  | Comp. Ex. 1 | Comp. Ex. 2 | Comp. Ex. 3 | Comp. Ex. 4 | Example 1 | Example 2 | Example 3 |
|---|---|---|---|---|---|---|---|
| Styrene-butadiene rubber[1] | 80 | 80 | 100 | 30 | 80 | 80 | 80 |
| Butadiene rubber[2] | 20 | 20 | — | 70 | 20 | 20 | 20 |
| Silica[3] | 60 | 60 | 60 | 60 | 60 | 60 | 60 |
| Silane coupling agent[4] | 5 | — | — | — | — | — | — |
| Silane coupling agent[5] | — | 0.1 | 5 | 5 | 5 | 10 | 20 |
| Softening agent[6] | 35 | 35 | 35 | 35 | 35 | 35 | 35 |
| Zinc oxide[7] | 3 | 3 | 3 | 3 | 3 | 3 | 3 |
| Stearic acid[8] | 1 | 1 | 1 | 1 | 1 | 1 | 1 |
| Aging preventing agent[9] | 2.5 | 2.5 | 2.5 | 2.5 | 2.5 | 2.5 | 2.5 |
| Vulcanization accelerator[10] | 1.8 | 1.8 | 1.8 | 1.8 | 1.8 | 1.8 | 1.8 |
| Sulfur[11] | 2 | 2 | 2 | 2 | 2 | 2 | 2 |

[1]VSL5025 ® (manufactured by Lanxess AG)
[2]KBR01 ® (manufactured by Kumho Petrochemical Co., Ltd.)
[3]Ultrasil ® 7000Gr (manufactured by Evonik Industries AG)
[4]Si69 ® (Bis(triethoxysilylpropyl)tetrasulfane (TESPT), manufactured by Evonik Industries AG)
[5]Vinyltris(2-methoxyethoxy)silane (manufactured by Sigma-Aldrich Co.)
[6]TDAE Oil
[7]Zinc oxide (manufactured by Hanil Chemical Industry Co., Ltd.)
[8]Stearic acid (manufactured by LG Chem, Ltd.)
[9]N-1,3-dimethylbuthyl-N-phenyl-p-phenylenediamine (manufactured by Lanxess AG)
[10]N-cyclohexyl-2-benzothiazylsulfenamide (manufactured by Lanxess AG)
[11]Ground sulfur (manufactured by Miwon Commercial Co., Ltd.)

Test Examples

Properties Measurement

Rubber specimens were produced using the rubber compositions for tire tread prepared in Comparative Examples 1 to 4 and Examples 1 to 3, and for the rubber specimens thus produced, various properties were evaluated according to the methods described below. The results are presented in the following Table 2.

(1) Mooney viscosity (ML1+4, 125° C.): The Mooney viscosity was measured using Mooney MV2000 (Alpha Technologies, Inc.) and a large rotor, under the conditions of a preheating time of 1 minute, a rotor operating time of 4 minutes, and a temperature of 125° C.

(2) Tensile properties: The hardness was measured using a Shore A hardness meter, and the tensile properties were measured using an Instron testing machine according to the testing method of ASTM D412.

(3) Viscoelasticity: Viscoelasticity was measured using a dynamic material testing system (DMTS), while performing temperature sweep at a temperature ranging from −60° C. to 80° C., under the conditions of 10 Hz, a static strain of 5% and a dynamic strain of 0.5%. At this time, as the tan δ value at 0° C. is higher, the braking performance on wet road surfaces is superior, and as the tan δ value at 60° C. is lower, the tire acquires lower rolling resistance performance.

(4) Abrasion resistance performance: In order to predict the abrasion resistance performance, the amount of abrasion was measured using a Lambourn abrasion tester under the conditions of a slippage ratio of 25%, and then the amount of abrasion was expressed as an index based on the value obtained in Comparative Example 1 as 100. A larger value of this index means superior abrasion resistance performance.

TABLE 2

| Properties |  | Comp. Ex. 1 | Comp. Ex. 2 | Comp. Ex. 3 | Comp. Ex. 4 | Example 1 | Example 2 | Example 3 |
|---|---|---|---|---|---|---|---|---|
| Properties in unvulcanized state | ML1 + 4 (125° C.) | 42 | 58 | 42 | 52 | 37 | 41 | 40 |
|  | Hardness (Shore A) | 57 | 63 | 58 | 63 | 59 | 58 | 54 |
| Tensile properties | 100% Modulus (kgf/cm$^2$) | 28 | 33 | 28 | 29 | 27 | 26 | 25 |
|  | 300% Modulus (kgf/cm$^2$) | 85 | 64 | 95 | 99 | 96 | 93 | 94 |
|  | Elongation ratio (%) | 521 | 411 | 480 | 400 | 510 | 501 | 495 |
|  | Tensile strength (kgf/cm$^2$) | 212 | 168 | 210 | 188 | 229 | 221 | 218 |
| Viscoelasticity | 0° C. tan δ | 0.278 | 0.264 | 0.267 | 0.252 | 0.285 | 0.279 | 0.276 |
|  | 60° C. tan δ | 0.138 | 0.194 | 0.137 | 0.147 | 0.112 | 0.116 | 0.132 |
| Abrasion resistance performance |  | 100 | 90 | 92 | 94 | 111 | 108 | 102 |

To explain with reference to the results of the above Table 1, in the case of the Mooney viscosity, the rubber specimens of Examples 1 to 3 that contain silane compounds containing vinyl groups as coupling agents exhibited lower values compared with the rubber specimen of Comparative Example 1 in which a silane coupling agent containing a sulfide group was used, and the rubber specimen of Comparative Example 2 in which the content of the silane compound was not included in the scope of the present invention. This is because in the rubber specimens of Examples 1 to 3, silica was uniformly dispersed due to the use of silane compounds containing vinyl groups, and as a result, the Mooney viscosity was decreased. From these results, it can be seen that the rubber compositions of Examples 1 to 3 that contained silane compounds containing vinyl groups exhibit superior effects in terms of the processability of the rubber composition.

Furthermore, the rubber specimens of Examples 1 to 3 exhibited markedly low Mooney viscosities when compared with the rubber specimen of Comparative Example 4 in which the composition of the raw material rubber did not satisfy the conditions of the present invention. In the case of Comparative Example 4, since the content of the butadiene rubber was excessively high, and mixing processability was decreased, the Mooney viscosity increased.

In the case of the tensile properties, the rubber specimens of Examples 1 to 3 exhibited generally increased tensile properties as compared with the rubber specimens of Comparative Examples 1 and 2, and exhibited excellent performance in terms of hardness, 100% modulus, 300% modulus, and tensile strength. Particularly, when compared with the rubber specimens of Comparative Examples 3 and 4 that did not satisfy the conditions of the raw material rubber, the specimens of Examples 1 to 3 exhibited markedly improved effects in terms of elongation and tensile strength.

Furthermore, in the case of viscoelasticity, the rubber specimens of Examples 1 to 3 exhibited higher tan δ values at 0° C. while having lower tan δ values at 60° C. as compared with the case of Comparative Examples 1 to 4, and thus exhibited improved rolling resistance performance. Thus, it can be expected that the fuel consumption of cars is also increased thereby.

In regard to the abrasion resistance performance, Examples 1 to 3 exhibited higher values than in the case of Comparative Examples 1 and 2, and exhibited superior abrasion performance. Furthermore, when compared with the rubber specimens of Comparative Examples 3 and 4 that did not satisfy the conditions of the raw material rubber, the specimens of Examples 1 to 3 exhibited more improved abrasion resistance performance. This is because as the content of the butadiene rubber increased, it is more advantageous in the abrasion resistance performance; however, Comparative Example 4 did not contain such a butadiene rubber, and Comparative Example 4 contained an excessively large amount of butadiene so that the miscibility of the butadiene rubber with the styrene-butadiene rubber was decreased, and uniform mixing was not achieved. This caused rather deteriorated abrasion resistance performance.

From the experimental results described above, it can be seen that Examples 1 to 3 that contained vinyl group-containing silane-based coupling agents and satisfied the optimal polymerization conditions of the constituent components of the rubber composition including the raw material rubber, exhibited markedly improved characteristics in terms of mechanical properties, rolling resistance characteristics, and abrasion resistance.

Preferred embodiments of the present invention have been described above in detail, but the scope of rights of the present invention is not intended to be limited to the embodiments, and various modifications and improvements made by those having ordinary skill in the art utilizing the fundamental concept of the present invention as defined in the claims are also included in the scope of rights of the present invention.

What is claimed is:
1. A rubber composition for tire tread, comprising:
   100 parts by weight of raw material rubber;
   10 parts to 100 parts by weight of a reinforcing filler;
   1 part to 10 parts by weight of zinc oxide;
   1 part to 10 parts by weight of stearic acid; and
   1 part to 20 parts by weight of a silane compound represented by the following formula (1),
   wherein the raw material rubber comprises 40 parts to 90 parts by weight of a styrene-butadiene rubber, and 10 parts to 60 parts by weight of a butadiene rubber, and
   wherein the styrene-butadiene rubber has a styrene content of 22% to 25% by weight, a vinyl content of 15% to 18% by weight, a number average molecular weight (Mn) of 55,000 to 59,000, a weight average molecular weight (Mw) of 260,000 to 320,000, and a molecular weight distribution (MWD) of 3.8 to 4.2:

[Chemical Formula 1]

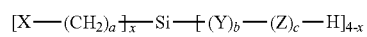

wherein in the formula (1),
X represents a vinyl group;
Y represents a functional group represented by the following formula (2a);
Z represents a functional group represented by the following formula (2b):

[Chemical Formula 2a]
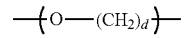

[Chemical Formula 2b]
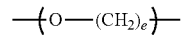

(wherein d and e each independently represent an integer from 0 to 6);
a represents an integer from 0 to 6;
b and c each independently represent an integer from 0 to 2 and do not necessarily represent 0 at the same time; and
x represents an integer from 1 to 3.

2. The rubber composition for tire tread according to claim 1, wherein the silane compound has a weight average molecular weight of 180 g/mol to 20,000 g/mol.

3. The rubber composition for tire tread according to claim 1, wherein the silane compound is selected from the group consisting of vinyltris(2-methoxyethoxy)silane, triethoxyvinylsilane, and mixtures thereof.

4. The rubber composition for tire tread according to claim 1, wherein the reinforcing filler is selected from the group consisting of a carbon black having a nitrogen adsorption specific surface area of 30 m$^2$/g to 300 m$^2$/g and an n-dibutyl phthalate (DBP) oil absorption of 60 cc/100 g to 180 cc/100 g; a silica having a nitrogen adsorption specific surface area of 100 m$^2$/g to 180 m$^2$/g and a cetyltrimethylammonium bromide (CTAB) adsorption specific surface area of 110 m$^2$/g to 170 m$^2$/g; and mixtures thereof.

5. The rubber composition for tire tread according to claim 1, wherein the rubber composition for tire tread further comprises additives selected from the group consisting of 0.5 parts to 5 parts by weight of a vulcanizing agent; 0.1 parts to 10 parts by weight of a vulcanization accelerator; 1 part to 50 parts by weight of a softening agent; 0.1 parts to 10 parts by weight of an aging preventing agent; 0.5 parts to 10 parts by weight of an adhesive; and mixtures thereof, all relative to 100 parts by weight of the raw material rubber.

6. A tire produced using the rubber composition for tire tread according to claim 1.

7. A tire produced using the rubber composition for tire tread according to claim 2.

* * * * *